United States Patent [19]
Filipp et al.

[11] 3,873,697
[45] Mar. 25, 1975

[54] HISTAMINE ANTIGEN
[75] Inventors: Geza Filipp, Saarbrucken; Heinz Schneider, Riegelsverg/Saar, both of Germany
[73] Assignee: Heinrich Mack Nachf. Chem.-pharmazeutische Fabrik, Illertissen, Germany
[22] Filed: Aug. 10, 1973
[21] Appl. No.: 387,256

Related U.S. Application Data
[60] Continuation of Ser. No. 309,760, Nov. 11, 1972, , which is a continuation of Ser. No. 48,852, June 12, 1970, , which is a division of Ser. No. 796,624, Nov. 12, 1968, , which is a division of Ser. No. 537,297, March 25, 1966.

[52] U.S. Cl. .................................. 424/177, 260/112
[51] Int. Cl. ............................................ A61k 27/00
[58] Field of Search ...................................... 424/177

[56] References Cited
UNITED STATES PATENTS
| | | | |
|---|---|---|---|
| 3,466,368 | 9/1969 | Sela et al. | 424/177 |
| 3,763,135 | 10/1973 | Shanbrom et al. | 424/177 |

*Primary Examiner*—Elbert L. Roberts
*Attorney, Agent, or Firm*—Sandoe, Hopgood & Calimafde

[57] ABSTRACT

A histamine compound is provided for treating allergic diseases comprising histamine-(2-azo-1)-benzene-(4-azo)-human-gamma-globulin.

4 Claims, No Drawings

HISTAMINE ANTIGEN

This is a continuation of copending application Ser. No. 309,760, filed Nov. 11, 1972, which application is a continuation of application Ser. NO. 48,852, filed June 12, 1970, which is a division of application Ser. No. 796,624, filed Nov. 12, 1968, which prior application is a division of Ser. No. 537,297, filed Mar. 25, 1966.

The present invention relates to a novel histamine antigen and composition containing the same.

It is known that allergic diseases are due to an antigen-antibody reaction in which there are liberated biologically active substances such as histamine by which the symptoms of allergic-anaphylactic processes are produced. Accordingly, for the treatment of these diseases, anti-histamines, inter alia, have been used up to now, but they have the disadvantage that they act only for as long as they are taken and do not act in connection with certain diseases, for instance in the case of bronchial asthma. For this reason, it has already been proposed that the body be actively immunized with substances which contain the histamine incorporated in a compound. In these compounds, the histamine is bound, via a chemical compound, to horse or cattle serum proteins as vehicle. A proposal in accordance with which this combination was effected via a carbonyl imide compound did not prove successful since this bond was too easily hydrolyzable and so rapidly cleaved that the antigen decomposed. In accordance with another proposal, the histamine was bound via azo compounds to the cattle or horse serum proteins, and latter to cattle or horse serum globulin. This bond in itself proved better, but the histamine azo-protein was not fully satisfactory so that it was not introduced into medicine although the initial works were published as early as 1946.

It is an object of the present invention to provide novel histamine compounds. It is also an object of the present invention to provide histamine containing compositions effective as medicants. The invention also provides a process for producing said novel histamine compounds and compositions.

In accordance with the present invention, it has now surprisingly been found that a histamine-azo-compound can be used for the treatment of allergic diseases if human gamma-globulin is used as vechile.

The novel histamine anigens are prepared by a method in which an aromatic diamine which is blocked on one nitrogen and may possibly be substituted is diazotized, and coupled with histamine or a derivative thereof, whereupon the resultant intermediate product is again diazotized after removal of the blocking group. This method is characterized by the fact that the diazo compound obtained in this manner is coupled with human gamma-globulin.

In more detail, the novel diazo-gamma-globulin products are prepared by blocking one nitrogen atom of an aromatic diamine, e.g. p-phenylene diamine, with a conventional and readily removed blocking group, i.e., an acetyl group such as

or an eqivalent residue of a longer chain carboxylic acid. The blocked product is then diazotized following conventional procedures, and the diazotized product coupled to histamine by reaction with a water soluble histamine salts, e.g. histamine chloride. It is only necessary that the histamine salt is soluble in water, the type of the anion is not critical, as the anion is not contained in the finished product. This diazotized salt is then treated in an alkaline aqueuos solution to hydrolyze whereby the blocking group is removed to produce p-aminobenzeneazo-histamine, which is then also diazotized following conventional procedures to produce the diazonium salt. This diazonium salt is then coupled with human gamma-globulin to produce the reaction product of the diazonium benzene-azo-histamine salt with human gamma-globulin.

This compound has the following formula:

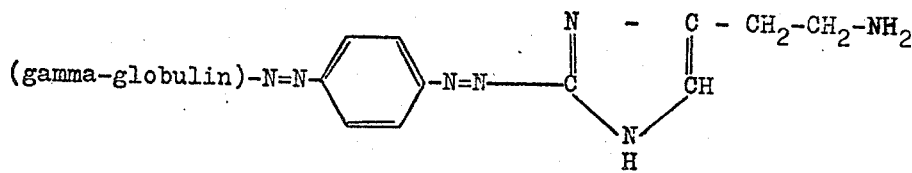

and is histamine - [2 azo 1] - benzene - [4 azo] - human gamma-globulin.

The coupling in accordance with the invention is carried out with three moles of the diazonium salt, e.g. diazonium chloride, to one mole of the human gamma-globulin. However, it is preferably carried out with excess human gamma-globulin so as to make certain that no excess diazo-compound, i.e., unreacted diazonium salt, is present in the resultant solution. A considerably excess of human gamma-globulin cannot be injurious, even upon intramuscular injection, since this gamma-globulin does not cause any reactions.

If desired, the aqueous solution obtained in this manner can be further purified by dialyzing and it is then immediately ready for use, unless dilution or concentration of the preparation for use is necessary. The reaction is preferably carried out in such a manner that there is finally obtained a solution of such a nature that 1 ml of histamine azo-gamma-globulin solution contains from 2 to 600 mg of, preferably from 40 mg to 80 mg of histamine- <2 azo 1> - benzene - <4 azo> -gamma-globulin and suitable amounts of physiologically acceptable salts, such as sodium chloride, to adjust the solution to both, the desired isotonic concentration and the desired $P_H$ - value.

The invention will be further explained in detail by the following example.

EXAMPLE 15 grams (0.1 mole) of finely powdered, very pure p-amino-acetanilide, 50 ml of ice-cold 2N HCl and some finely pounded ice were mixed by stirring in a mortar. The suspension was transferred into a beaker and cooled to 0°C. Then under stirring additional 75 ml of ice-cold 2N HCl were added. This solution was diazotized with a solution of 7.5 g (0.1 mole) of $NaNO_2$ in 100 ml of water under stirring at 0° - 5°C. Stirring was continued for additional 10 minutes. Solution A.

15 grams (0.1 mole) of pure histamine hydrochloride were dissolved in 100 ml of water and adjusted to a pH of 10 by addition of about 50 ml of 2N NaOH. Then under stirring the filtered solution A was added. After one hour, the precipitated p-acetamino-benzene-azo-histamine was separated by centrifuging and squeezed out on a clay dish in order to dry it.

The isolated product was sufficiently pure for subsequent treatment.

28 g (0.1 mole) of p-acetaminobenzene-azo-histamine as prepared above were heated with a solution of 15 g KOH in 200 ml of 75 percent alcohol for six hours on a boiling water bath under reflux. After cooling down, the reaction solution was diluted with 500 ml of water, and the alcohol was distilled off. To the still warm, red solution 220 g NaCl were added and dissolved. After cooling down and filtering 13.5 g of p-aminobenzene-azo-histamine which contained some NaCl were separated.

235 mg (1 mmole) of p-aminobenzene-azo-histamine, as prepared above, were suspended under stirring in 100 ml of water and treated with 320 ml (3.7 mmole) of N/100 HCl. Thereby, the color of the solution darkened. It was cooled to 0°–5°C and at this temperature diazotized with a solution of 70 mg (1 mmole) of $NaNO_2$ in 100 ml of water which was added in a single portion thereto. With this method of operation, no liberation of gas took place. The solution was allowed to stand for 10 minutes. Solution B.

To 32 g of human gamma-globulin, dissolved in 200 ml of water, 700 ml of boric acid buffer were added. (The buffer was prepared as follows: 3.92 g of phosphoric acid, 2.42 g of acetic acid and 2.47 g of boric acid were dissolved in distilled water, adjusted to a pH of 8.5 with 0.2 N NaOH and filled up to 1,000 ml with distilled water.)

The filtered solution B was now added to the buffered gamma-globulin solution. Under sterile conditions the solution was dialyzed with 0.6 percent NaCl solution at room temperature for 40 hours. The dialyzed solution then had a volume of about 1,200 ml.

The solution was concentrated in vacuum to 720 ml at an inside temperature of 30°C. After addition of 80 ml of a 0.2 percent solution of phenol in water, the solution was filled into ampoules which were sterilized by tyndallizing three times by heating to 55°C for thirty minutes at intervals of 24 hours.

The solution as prepared above could be administered immediately after the sterility test was accomplished.

One ml solution ready for injection contained 40 mg histamine- <2 azo 1> -benzene- <4 azo> -gamma-globulin, 9 NaCl and 0.2 mg phenol.

The aromatic diamine, p-phenylene diamine, may be substituted, particularly on the nuclear carbon atoms. The corresponding blocked compound will be similarly substituted. Similarly, the histamine may be substituted both on the imidazolyl nucleus and on the ethylamine side chain. Such substituted compounds may be used in the instant process to produce the corresponding substituted diazonium salt which is coupled to the human gamma-globulin. These substituted reactants and products are the equivalents of the unsubstituted compound referred to in this application.

Clinical tests were carried out with the histamine-azo-human-gamma-globulin of the invention, these tests giving excellent results in allergic diseases, for instance bronchial asthma, urticaria, Quincke's disease, and allergic migraine attacks, and good results were also obtained in connection with other forms of headache. When treating the patients, it is advisable to effect the first immunization with a larger quantity of substance.

From 1 to 3 and up to 5 ml of histamine-azo-human-gamma-globulin solution daily every second or third day in a total dose from about 5 to 50 ml can be administered without objection. In general as experience shows, for immunization 1.5 ml per dose daily every third day in a total dose of 9 ml, in difficult cases of allergic diseases up to 15 ml, proved to be sufficient.

This immunization, once achieved, lasts for a long time - 1 to 1½ years, depending on the patient, and can then be completely restored by a few injections. Up to the present time, no local or general reactions were observed on the part of the patient. The administration is effected subcutaneously or intramuscularly and the treatment is employed in particular when other methods of causal treatment, such as specific desensitization, are not possible. The histamine-azo-human-gamma-globulin is preferably administered in a saline solution or an equivalent pharmaceutically acceptable aqueous solution. When the pathogenic anitigen can be determined, it is advisable first of all to effect specific desensitization or to remove the antigen from the vicinity of the patient. It is advisable to use the histamine-azo-human-gamma-globulin in cases in which the pathogenic allergen is neither anamnestic or determinable by cutaneous tests. This is true in large percentages of allergically caused ailments.

The histamine-azo-human-gamma-globulin of the invention differs from the antihistamines previously employed in particular by the fact that the body is actively immunized to histamine. The histamine liberated in the antigen-antibody reaction is neturalized immunochemically, so to say, in statu nascendi, or before the organs affected are reached. In this way, furthermore, the long-lasting action is obtained.

While the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. The method of treating such allergic diseases as bronchial asthma, urticaria, Quincke's disease and migraine headaches in humans which comprises administering to a human an effective amount of a compound formed as a coupled reaction product obtained by reacting one mole of human gamma-globulin with 3 moles of the salt diazonium benzene-azo-histamine chloride in a physiologically acceptable solution, said reaction being carried out with an excess of said gamma-globulin to inhibit the presence of unreacted salt in the final solution, the compound administered being histamine- <2 azo 1> -benzene- <4 azo> -gamma-globulin contained in a pharmaceutically acceptable aqueous solution at a concentration of about 2 mg/ml to 600 mg/ml of solution.

2. A pharmaceutical solution composition for use in treating humans for such allergic diseases as bronchial asthma, urticaria, Quincke's disease and migraine headaches consisting essentially of a compound formed as a coupled reaction product obtained by reacting one mole of human gamma-globulin with 3 moles of the salt diazonium benzene-azo-histamine chloride in a physiologically acceptable solution, said reaction being carried out with an excess of said gamma-globulin to inhibit the presence of unreacted salt in the final solution, said coupled reaction product being histamine - <2 azo 1> - benzene - <4 azo> - gamma-globulin and being contained in a pharmaceutically acceptable aqueuous solution at a concentration of 2 mg/ml to 600 mg/ml.

3. The method of claim 1 in which the concentration of the compound in the solution aadministered ranges from about 40 mg/ml to 80 mg/ml.

4. The composition of claim 2, wherein the concentration of the compound in solution ranges from about 40 mg/ml to 80 mg/ml.

* * * * *